United States Patent [19]

Orain

[11] 4,273,209
[45] Jun. 16, 1981

[54] POWER TRANSMITTING DEVICE AND APPLICATIONS THEREOF

[75] Inventor: Michel A. Orain, Conflans Ste Honorine, France

[73] Assignee: Glaenzer Spicer, Poissy, France

[21] Appl. No.: 11,870

[22] Filed: Feb. 13, 1979

[30] Foreign Application Priority Data

Feb. 13, 1978 [FR] France ............................ 78 03978
Apr. 26, 1978 [FR] France ............................ 78 12335

[51] Int. Cl.³ ........................................... F16D 3/02
[52] U.S. Cl. .................................. 180/254; 64/1 V; 64/17 R; 64/21
[58] Field of Search ................ 64/8, 21, 17 R, 1 B; 267/63 R, 141, 153; 308/3 R, 3 A; 180/252, 253, 254

[56] References Cited

U.S. PATENT DOCUMENTS

| 2,125,615 | 8/1938 | Kittredge | 64/7 |
| 3,995,513 | 12/1976 | Amdall et al. | 64/1 V X |
| 4,065,941 | 1/1978 | Aoki | 64/8 X |
| 4,068,499 | 1/1978 | Sharp | 64/21 X |

FOREIGN PATENT DOCUMENTS

846797 9/1939 France ........................................... 64/21
596945 1/1948 United Kingdom ........................ 64/21

*Primary Examiner*—John J. Love
*Assistant Examiner*—Michael Mar
*Attorney, Agent, or Firm*—Schuyler, Banner, Birch, McKie & Beckett

[57] ABSTRACT

The homokinetic transmission device is placed between a driving shaft and a driven shaft comprising two adjacent articulated joints. The articulated joints comprise a common intermediate member and are generally homokinetic and at least one of the joints is slidable. The arrangement of the two joints is adapted to permit a relative radial displacement between the two shafts. If h and l are the respective distances between the centers of the two adjacent tripod joints and the center of gravity of the transmission device interconnecting the two shafts, and $\rho^2$ and Io/m, where Io represents the inertia of an intermediate member about an axis perpendicular to its general axis and to the direction of lateral displacement of said member and intersecting the center of gravity G, and where m represents the mass of the intermediate member, the following conditions are at least roughly satisfied:

$$h \times l = \rho^2.$$

18 Claims, 11 Drawing Figures

FIG.1

FIG_2

FIG_3

FIG_4

FIG_5

POWER TRANSMITTING DEVICE AND APPLICATIONS THEREOF

DESCRIPTION

The present invention relates to a device capable of providing a homokinetic power transmission between a driving shaft and a driven shaft.

Such devices are employed in particular in front-wheel vehicles for transmitting the power from the engine to the driving wheels. They usually comprise a shaft in the form of a bar or tube having at each end an articulated transmission joint. Now, modern internal combustion engines attain a high power/weight ratio and have vibrational rates which are difficult to reduce. In order to ensure the comfort of the passengers, the engine is suspended from the structure of the vehicle by flexible blocks so that the vibrations produced thereby are not propagated to the whole of the vehicle. Under these conditions, the sole solid connection capable of transmitting these vibrations from the engine to the structure of the vehicle are the transmission shafts. A transmission shaft may be considered as a heavy rigid beam bearing at both ends through its two homokinetic articulated joints, on one hand, on the vibration-generating engine unit, and, on the other hand, on the hub and the wheel swivel structure which are connected to the structure of the vehicle by the suspension arms. It may be considered that at least two vibratory and sound phenomena can occur:

1. The putting into resonance of the elements of the body of the vehicle by the excitations of the engine transmitted by the transmission shaft.

2. Resonance of the shaft itself in bending when the frequencies of the vibrations of the engine are in tune with its own frequency, which amplifies the energy of the oscillations transmitted to the body.

Some known homokinetic joints, such as tripod joints, always provide a very free sliding which avoids the transmission of the axial components of the vibrations. On the other hand, the radial components of these vibrations, which are directed in a direction perpendicular to the axis of the driving shaft or output shaft of the engine unit, are not filtered.

In order to prevent the putting into resonance of the shaft and the transmission of the vibrations of the engine to the compartment of the vehicle, several precautions have been proposed:

(a) The increasing of the rigidity against bending of the shaft, obtained by giving the shaft a large-diameter tubular structure.

In this way, the tuning frequency has been displaced upwardly in the range of 100 to 200 Hz approximately without truly solving the problem since one is limited by the acceptable weight and overall size of the tube.

(b) The increasing of the flexibility of the shaft, which may be achieved by employing bars of very high strength steel of small section.

Here again, one is limited by the conditions of strength and rigidity in torsion of the shaft; moreover, in this case, the vibrations in bending appear at lower frequencies but are nonetheless disadvantageous; consequently, an attempt has been made to counter them by means of beaters tuned to this frequency and formed by massive rings which are elastically suspended in the region of the antinode of the bending waves. However, such beaters are space-consuming and expensive and often produce other resonances and in fact merely shift the problem without producing a very substantial improvement.

There is also known a device described in the U.S. Pat. No. 2,125,615 in which two tripod joints are interconnected by a common intermediate member defining two raceways. However, in this device, which is already of old design, the problem of the transmission of the radial components of the vibrations between the two shafts is neither considered nor solved. Indeed, the low frequency vibrations are transmitted owing to the small amount of freedom offered under torque by the mounting of the rollers provided in this prior patent and nothing is moreover proposed for eliminating the high frequency components of these vibrations.

An object of the invention is consequently to provide a transmission device adapted to be interposed between a driving shaft and a driven shaft and capable of providing a homokinetic transmission between these two shafts while preventing the transmission of the axial and radial components of the vibrations of the driving shaft. According to the invention there is provided a homokinetic transmission device placed between a driving or engine shaft and a driven or receiving shaft, comprising two adjacent articulated joints which are together homokinetic and at least one of which joints is slidable, said two joints being interconnected by a common intermediate member, wherein the arrangement of the two joints is adapted to permit a relative radial displacement between the two shafts to be interconnected and, if h and l are the respective distances between the centres of the two adjacent tripod joints and the centre of gravity of the transmission device interconnecting the two shafts and $p^2$ is equal to Io/m where Io represents the inertia of the intermediate member about an axis perpendicular to its general axis and to the direction of lateral displacement of said member and intersecting the centre of gravity G and where m represents the mass of the intermediate member, the following condition is at least roughly satisfied: $h \times l = p^2$.

According to other features:

the intermediate member is retained elastically relative to at least one of the two driving and driven shafts;

the two adjacent joints are of the tripod type of joint;

the intermediate member is a short section of shaft carrying at both ends the respective tripods of the two joints.

Another object of the invention is to provide a transmission unit comprising a transmission device such as that defined hereinbefore connected at one end to a driving means and at its other end to a driven means, one of said two means being a transmission shaft connected moreover to another articulated homokinetic joint.

Such a unit is so arranged that there are provided additional guide means for the transmission shaft, said guide means being for example disposed in accordance with various embodiments either outside the transmission device or inside the latter.

The transmission shaft is preferably guided by a bearing carried by a support which comprises two branches respectively articulated to the upper and lower suspension arms of the vehicle.

According to other applications:

a transmission device according to the invention is interposed in a longitudinal transmission for an automobile, between an output shaft of an engine unit and a transmission shaft, said transmission shaft being supported by a bearing;

such a device is interposed in a device controlling the steering, between a steering column member and an arm rigid with a member engaging a rack;

the invention is employed in a transmission device in which two adjacent universal joints comprise a common intermediate member. Such an arrangement may for example be employed in a device controlling a gearbox, between two sections of a control rod which undergoes a movement of rotation and translation and extends into the gearbox for actuating speed selecting and changing means.

The invention will be described in more detail hereinafter with reference to the accompanying drawing which is given solely by way of example and in which.

Figure 1:
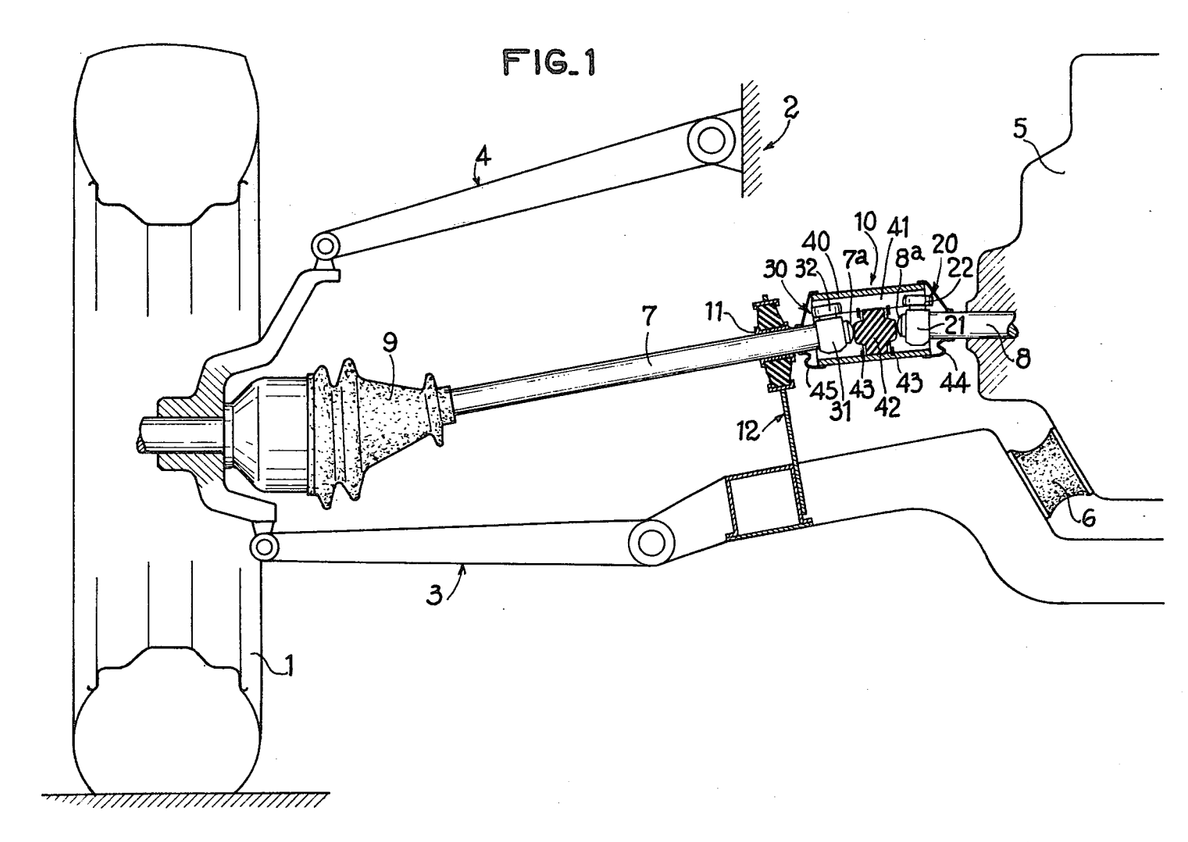
FIG. 1 shows a transmission unit for an automobile vehicle arranged in accordance with the invention.

FIG. 1 shows a transmission unit for an automobile vehicle. In such an arrangement, a driving wheel 1 is connected to the body or structure 2 of the vehicle through articulated arms 3 and 4. The engine unit 5 is suspended from the structure by elastic blocks such as 6. A transmission shaft 7 is driven by a driving shaft 8 constituted by the output shaft of the engine-drive unit, and it drives the driving wheel 1. A device 10 according to the invention is interposed between the shafts 7 and 8 and the shaft 7 is connected to the wheel 1 by a homokinetic joint 9. An elastic bearing 11 supports the transmission shaft 7, this bearing being connected to the structure of the vehicle by a support 12.

The transmission device 10 interposed between the shaft 7 and the driving shaft 8 will now be described in more detail. This device comprises two joints 20, 30 which are, in the presently-described embodiment, of the tripod type, these two joints being adjacent and interconnected by a common intermediate member 40. The first joint 20 comprises a tripod 21 carried by the driving shaft, the three trunnions of which tripod carry rollers 22 received in rectilinear raceways 41 which have a part-circular section and are defined by the intermediate sleeve 40. The second joint 30 also comprises a tripod 31 rigid with the transmission shaft 7 and carrying rollers 32 received in the same raceways 41 of the intermediate sleeve.

The rollers are journalled on their trunnions through lubricated needles so as to provide great freedom of rotation under the effect of torque and thereby eliminate transmission of vibrations at low frequency owing to a decrease, in the ratio of the order of 50 to 1, of the radial force required for radially displacing one of the shafts with respect to the other. The sleeve 40 is retained axially with respect to the two shafts 7, 8 by means of an elastic block 42 which is maintained in position relative to the sleeve by two elastically yieldable rings 43 the end faces of which rings are respectively in contact with the convex curved ends 7a, 8a of the two shafts.

Sealing gaiters 44, 45 are provided between the sleeve and the two shafts.

Figure 2:
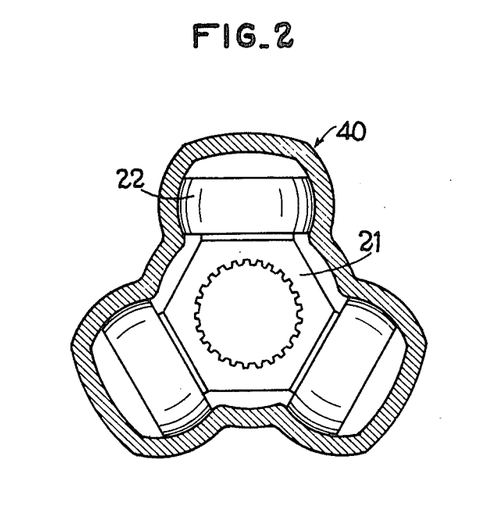
FIG. 2 is a sectional view taken on line 2—2 of FIG. 1.

FIG. 2 shows the sectional shape of the intermediate sleeve 40 and the arrangement of the tripods and rollers.

Figure 3:
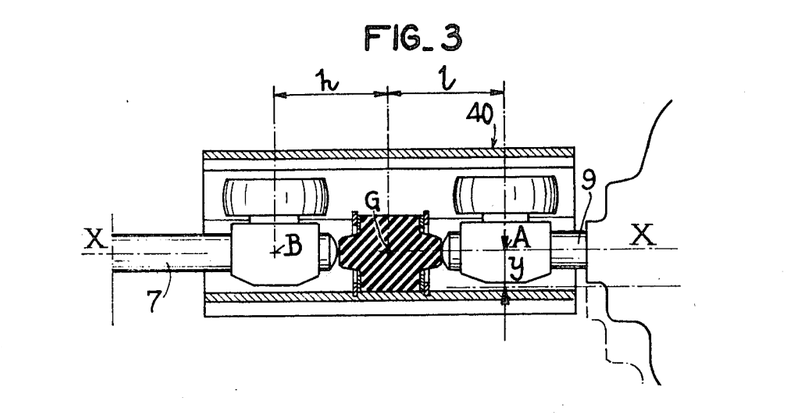
FIG. 3 is a detail view explaining the operation of a device according to the invention.

With reference now to FIG. 3, and if:

m is the mass of the sleeve;

Io is the inertia of this sleeve about an axis intersecting the centre of gravity G of the double joint and perpendicular to the general axis X—X of the sleeve and to the direction of displacement y;

h and l are the distances between the centre of gravity G and the respective centres B, A of the two tripods, there is established between these various magnitudes such a relation that the force of reaction exerted at B on the transmission shaft 7 is zero. This relation is expressed by the following formula:

$$h \times l = \rho^2$$

where $\rho$ represents the radius of gyration of the mass m for an inertia Io, namely: $Io = m\rho^2$.

Further, if the mass m is small, the moderate deviations from this condition only produce negligible reactions at B on the transmission shaft.

Owing to the presence of the two adjacent joints 20, 30, the device according to the invention allows not only an extremely free axial sliding but also a radial displacement of the driving shaft 8 with respect to the transmission shaft 7, with no substantial inertial radial reaction on the transmission shaft. Consequently, the latter receives no excitation and consequently cannot enter into resonance. Therefore it cannot transmit vibrations to the structure through the joint 9 of the wheel swivel structure and the suspension arms. The problem of comfort is thus solved by a complete insulation of the engine unit from the structure and the compartment of the vehicle. The bearing 12 supporting the transmission shaft allows a pivoting of the shaft and completes its insulation from the structure supporting it. Note that this bearing may also be of the swivel type instead of being formed by an elastic block as shown in FIG. 1.

Figure 4:
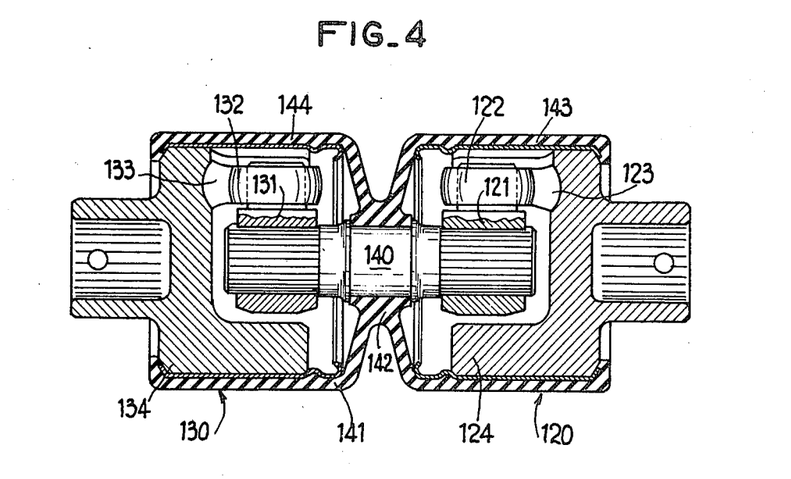
FIGS. 4 to 6 are longitudinal sectional views of three modifications.

FIG. 4 shows another embodiment in which the two adjacent tripod joints 120, 130 are not connected by a sleeve but by an intermediate section of a shaft 140 at two ends of which are provided the two tripods 121, 131 carrying rollers 122, 132. The latter are received in rectilinear raceways 123, 133 of part-circular section defined in tulip members or cups 124, 134 respectively rigid with the driving shaft 8 and the transmission shaft 7. The retainment of the intermediate shaft section 140 is here achieved by a double gaiter 141 of elastomer fixed to the intermediate shaft section by a centre portion 142 and surrounding the tulip members 124 and 134 by two sleeve portions 143, 144. This gaiter ensures both the retainment of the lubricant and the protection of the mechanism, in addition to its axial retaining function with respect to the movable part formed by the shaft 40 and the two tripods.

The sleeve 144 may replace the bearing 12 shown in FIG. 1 owing to its radial centering capacity.

In the embodiment shown in FIG. 4, the reactions are always cancelled out in satisfying the condition $hl = \rho^2$. This condition is easily satisfied by prolonging if necessary the intermediate shaft section beyond the two tripods or outside one of them. Once this result is obtained, the distances h and l remain constant and independent of the movements of elongation or the telescoping of the joints. Indeed, these two distances are here invariable by design.

In the arrangement shown in FIGS. 1 to 3, bearing in mind the lightness of the intermediate sleeve, it may be said that notwithstanding the slight variations of l and h resulting from the telescoping of the joint, the desired dynamic interruption is practically perfect.

Figure 5:
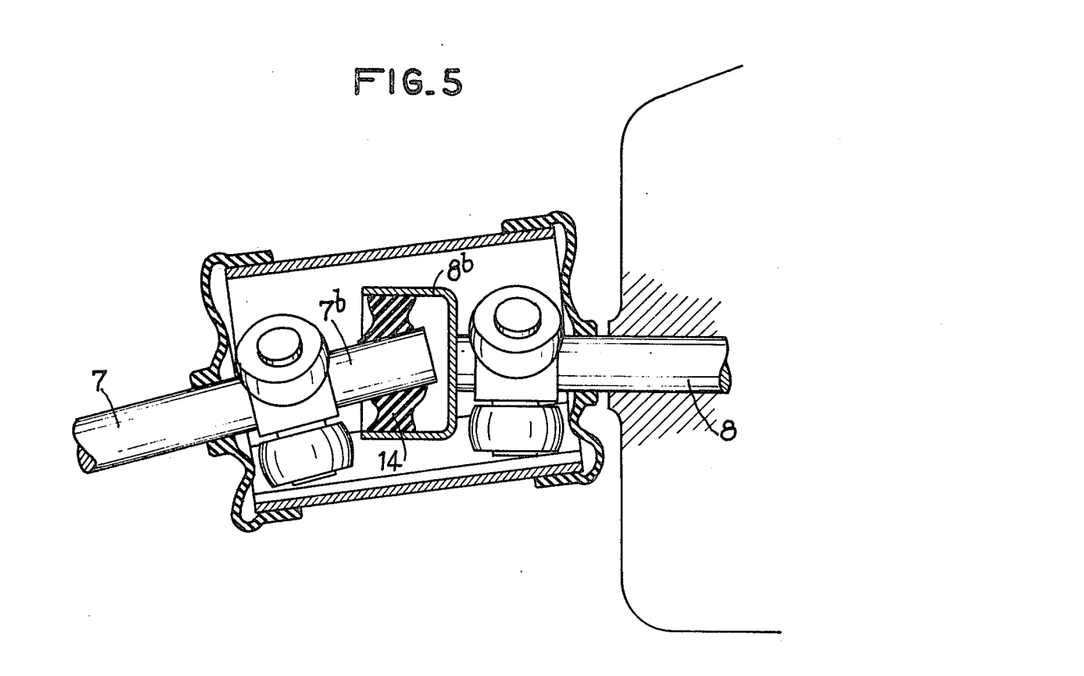

Shown in FIG. 5 is another modification of the first embodiment in which the guiding of the transmission shaft 7 is achieved, not by a bearing connected to the structure of the vehicle outside the transmission device 10, but by an extension 7b of this shaft which is guided with respect to an armature 8b rigid with the driving shaft 8, with interposition of an elastic block 14. In this embodiment, the elastic block is chosen in such manner as to provide a frequency proper of resonance of the transmission shaft which is lower than the undesirable vibrations of the driving shaft so that such an assembly remains effective. Also note that this block must be capable of withstanding without damage the high radial load resulting from the additional moment and retain its characteristics of radial flexibility.

Figure 6:
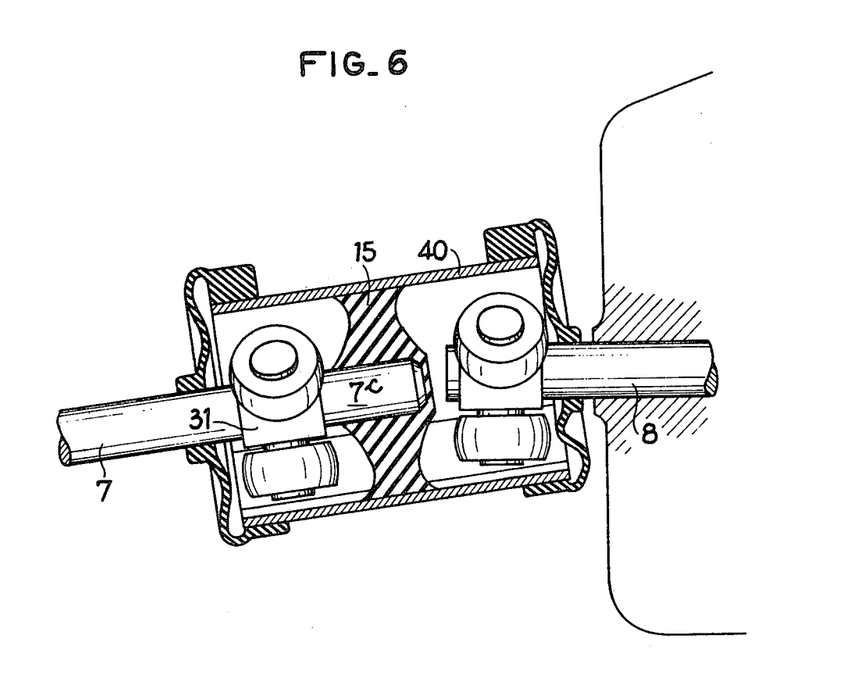

FIG. 6 shows an embodiment in which a radially and axially elastic block 15 is disposed between an extension 7c of the shaft 7 and the sleeve 40 and ensures the alignment of the sectioned sleeve 40 with the transmission shaft 7, while providing by its radial flexibility a frequency of suspension of the shaft which is lower than the undesirable frequencies of the engine unit. The characteristic of radial flexibility of this block and that of the block 14 (FIG. 5) may be non-linear and advantageously larger for the position of rest than when a radial bending is applied, so as to provide a low frequency of suspension at the normal speed on the road and be able to withstand the high radial load resulting from the additional moment under the extreme conditions of angle and high torque. By way of a modification, the elastic block could also be placed on the left of the tripod 31, that is to say at the end of the sleeve and thereby act as a sealing element between the sleeve and the shaft.

In the application to automobile vehicles, the invention provides a greatly improved comfort without the overall size or the cost being prohibitive. Indeed, a member such as the sleeve 40 or the shaft section 140, is light and cheap and the length and the diameter of the double joint may be held within completely acceptable limits. Moreover, although it is of light construction this arrangement permits the transmission of high torques.

Figure 7:
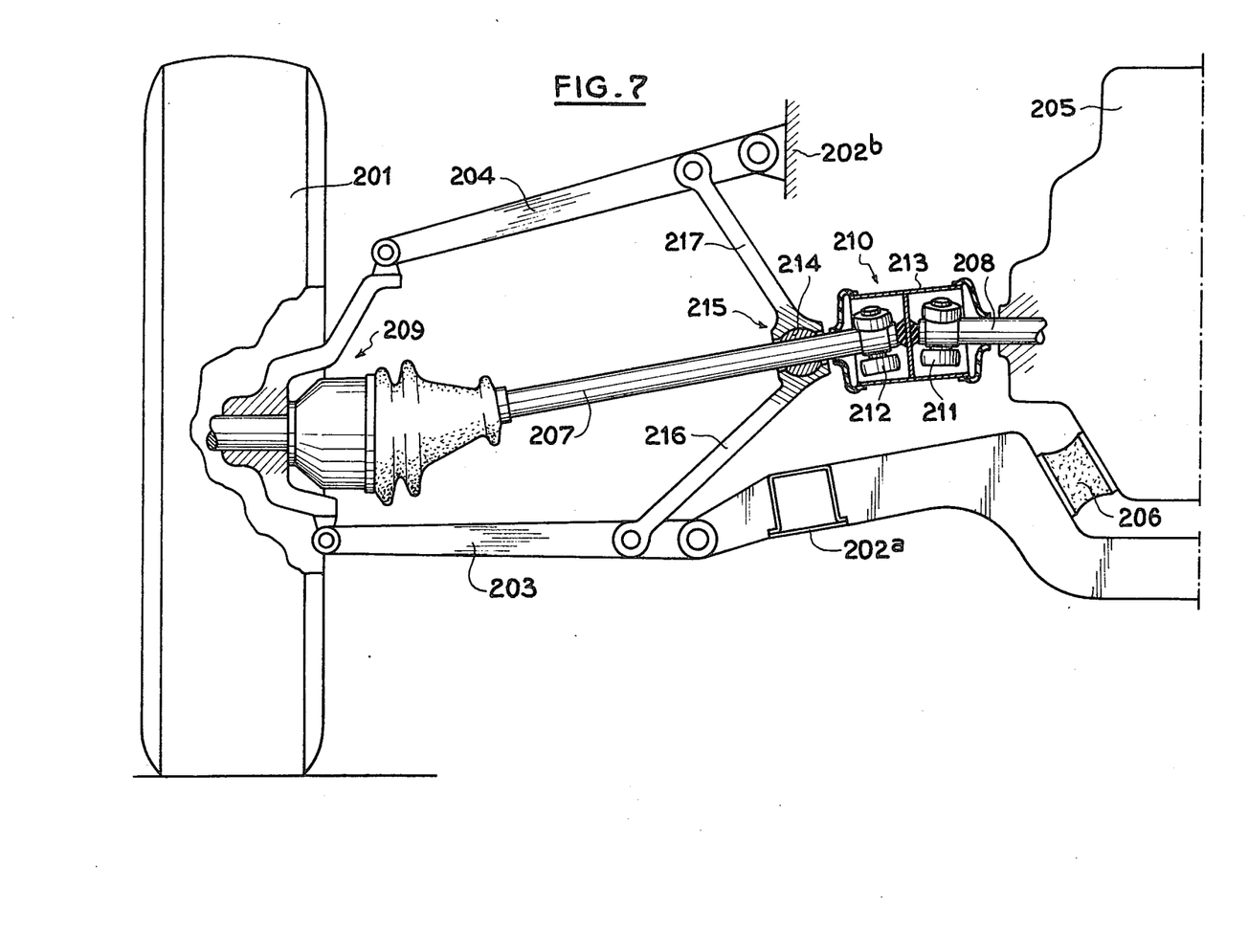
FIG. 7 is a partial sectional view of a transmission device applied to a front-drive vehicle.

FIG. 7 shows a transmission unit between a differential and a driving steering wheel 201. The wheel 201 is connected to the body or structure 202a, 202b of the vehicle by articulated arms 203, 204. The differential which is part of the engine unit 205 is suspended from the structure by elastic blocks 206. A transmission shaft 207 is driven by a driving shaft 208 which is the output shaft of the differential and it drives the driving wheel through a homokinetic articulated joint 209. A homokinetic articulated device 210 is interposed between the shafts 207 and 208, this device 210 being such as that described before and formed by two elementary tripod joints 211, 212 comprising a common intermediate member 213 connected elastically to at least one of the two adjacent shafts. The transmission shaft 207 is supported by a ball joint 214 which is carried by a support 215 comprising two arms 216, 217 which are connected at their ends to the suspension arms 203 and 204 by elastically yieldable articulations.

Owing to this arrangement, the angular displacements in the vertical plane of the two tripods of the device 210 are reduced, the support 215 accompanies the vertical movements of the suspension arms 203 and 204 which has for effect to pivot the shaft 207 about the point P located in the middle of the device 210 and thereby equally distribute between the two tripods which constitute the composite joint 210 the angularity which may exist between the shafts 207 and 208.

Figure 8:
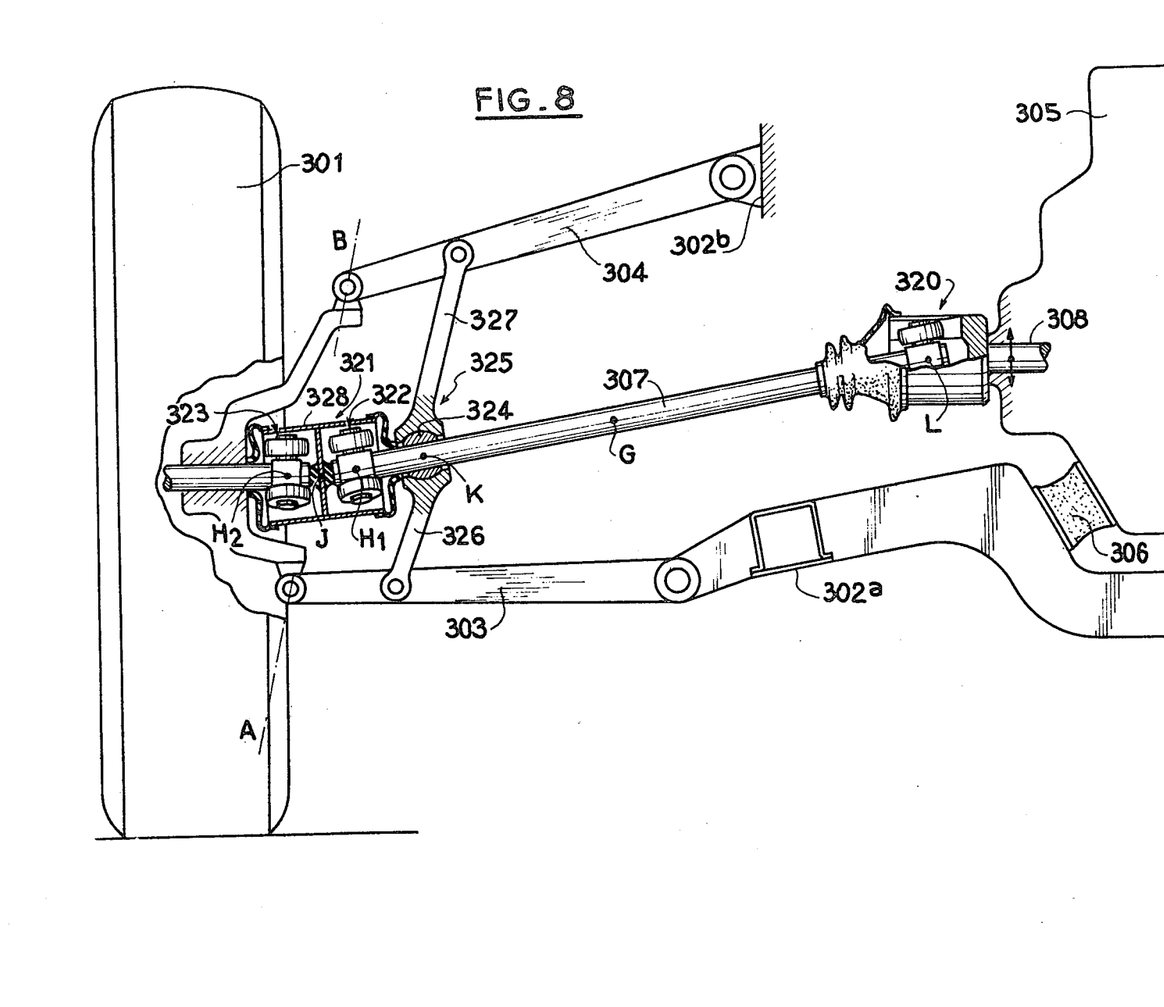
FIG. 8 is a similar view of a second embodiment.

In the arrangement shown in FIG. 8, a simple homokinetic articulated joint 320 is disposed between the shaft 308 and the transmission shaft 307 whereas a transmission device 321 according to the invention and having two tripod joints 322, 323 is interposed between the shaft 307 and the wheel stub-axle. The shaft 307 is guided by a bearing 324 which is carried, as in the embodiment shown in FIG. 7, by a support 325 whose branches 326 and 327 are articulated to the suspension arms 303 and 304. However, the bearing 324 is here placed in the vicinity of the device 321 and consequently close to the end of the shaft 307 adjacent the wheel. If:

G is the centre of gravity of the unit formed by the transmission shaft 307 and the two tripods that the shaft carries at both ends;

H1 is the centre of the first tripod 322 of the transmission device 321;

H2 is the centre of the second tripod 323;

J is the centre of gravity of the intermediate member 328 between these two tripods 322, 323;

K is the centre of the bearing 324;

L is the centre of the articulated joint 320;

$I_a$ the inertia of the shaft 307 provided with its two tripods relative to an axis intersecting its centre of gravity G and perpendicular to its axis;

$M_a$ is the mass of the shaft 307 provided with its two tripods;

$I_f$ is the inertia of the sleeve or of the intermediate member 328 with respect to its axis intersecting its centre of gravity J and perpendicular to its general axis;

$M_f$ is the mass of the sleeve or intermediate member 328.

In order to ensure that the transverse vibrations of the shaft 308 are not felt in the region of the bearing 324 at K, the following condition must be satisfied:

$$\overline{GL} \times \overline{GK} = \frac{I_a}{M_a} + \frac{I_f}{M_a} \times \frac{\overline{H_1K} \times \overline{LH_1}}{JH_1 \times H_1H_2} \quad (1)$$

Moreover, in order to to ensure that these vibrations are not felt at point H2, which is the centre of the tripod fixed to the wheel stub-axle, it is sufficient that:

$$JH_2 \times JH_1 = \frac{I_f}{M_f} \quad (2)$$

In this way, the radial vibrations undergone by the output shaft of the differential are transmitted to the homokinetic joint 320 and to the tripod 322 fixed to the end of the shaft 307. On the other hand, no inertial force appears in the region of the pivotal bearing 324 which is centered at K nor in the region of the tripod 323 centered at H2 and fixed to the wheel stub-axle. In this way, all the inertial reactions on the bearings connected to the structure of the vehicle are eliminated and there is a complete dynamic insulation of the engine from the compartment of the vehicle, which results in a reduction of noises and vibrations and a notable improvement in the comfort for the passengers.

The support 324 is articulated to the suspension arms at points which are so determined as to reduce the operating angles of the two tripods 322, 323 in the vertical plane. Moreover, the sleeve 328 is preferably placed in such manner that the pivot axis A, B intersects the axis of this sleeve roughly in the middle of its length so as to equally distribute the turning angle of the steering wheel between the two tripods centered at H1, H2. This permits, with two elementary joints each of which allows a displacement of 25°, using for driving a steering and driving wheel a joint having a large capability of angular movement (about 50°) which is in addition slidable.

Figures 9, 10, 11:
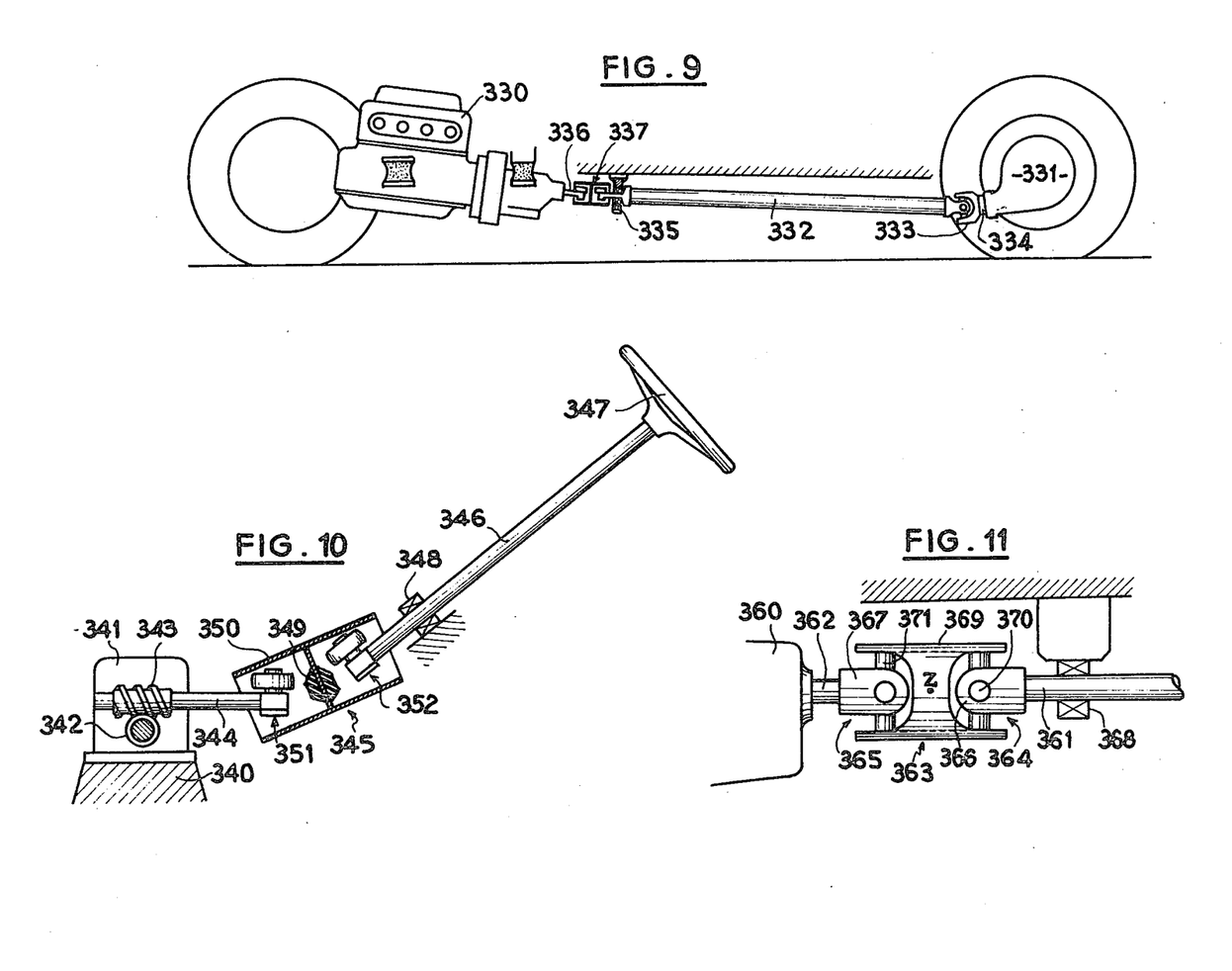
FIG. 9 is a diagrammatic view of a longitudinal transmission device in a vehicle having an engine unit located at the front and rear driving wheels.
FIG. 10 shows a diagrammatic view of a steering column comprising a device according to the invention.
FIG. 11 is a diagrammatic view of the application of the invention to a device controlling a gearbox.

In FIG. 9, the invention is applied to a longitudinal transmission between an engine-drive unit 330 and a rear differential 331. This transmission comprises a tubular shaft 332 of great length which is connected in the rear part by a universal joint 333 to the input shaft 334 of the differential gear and is supported in its front part by a bearing 335. In this front part, the tubular shaft is connected to the output shaft 336 of the gearbox by an articulated device 337 having two tripods and an intermediate sleeve such as that described hereinbefore.

The transmission shaft which is formed by a large-diameter tube having a thin wall behaves as a resonator and it is usually excited both by the vibrations of the engine and by those of the high-speed engagement of the pinion and the large crown wheel of the rear differential. Owing to the invention, this drawback is eliminated since the filtering is achieved by the double joint 337. Moreover, the bearing 335 is subjected to no radial vibration since the tripods of the intermediate joint 337 are located at the reciprocal centres of percussion of the sleeve and the frictions in this joint are quite negligible.

In the application to a steering column shown in FIG. 10, the invention avoids the repercussion on the steering wheel of the vibrations or shaking produced by the profile of the road in the structure of the vehicle diagrammatically shown at 340 on which a steering gearbox 341 is fixed. This box contains a rack 342 driven by a wheel 343 which is rigid with a steering shaft section 344 which forms one of the two means interconnected by a double articulated joint 345. The other means connected to this joint is formed by a second steering shaft section 346 which is connected to the steering wheel 347 and mounted in a bearing 348. A double abutment 349 provided with two elastic pads axially positions the intermediate sleeve 350 relative to the two tripods 351, 352. In this way, there is achieved a complete dynamic interruption between the box 341 and the steering column 346, 347 while of course satisfying the condition defined in the preamble concerning the position of the centres of the tripods 351, 352 with respect to the centre of gravity and to the transverse inertia of the sleeve 350. Apart from this advantage, note that in this application and owing to the large capacity of angular movement allowed by the device 350, the steering column may be arranged in the most comfortable manner for driving.

It will be understood that the two tripod joints 351, 352 may be replaced in this application by universal joints.

FIG. 11 shows the invention applied to a transmission mechanism between a selector lever (not shown in the drawing) and a rod capable of being driven in translation and rotation and extending into the gearbox 360 for actuating selecting and changing means.

According to the invention, the rod is formed in two sections 361, 362 which are interconnected by an articulated joint 363 having a double universal joint 364, 365 constituted by two simple jaws 366, 367 which are respectively fixed to the rod sections 361, 362. The section 361 is carried by a bearing 368. These two jaws are interconnected by a double jaw 369 and two spider members 370 and 371. This linkage transmits both the torques along the axis of the rods 361, 362 and the axial tension and compression forces so as to reproduce in the gearbox the actuation of the lever located in the compartment of the vehicle. In order to interrupt radial vibrations of the engine, that is to say vibrations perpendicular to the general axis of the rods 361, 362, the following condition has been satisfied:

$$h \times 1 = \frac{I}{M} = \rho^2$$

where I represents the inertia of the double jaw relative to the horizontal axis Z which is perpendicular to the plane of the drawing, and M the mass of this double jaw.

Note that the double universal joint has an important secondary advantage in that it allows important deviations between the gearbox and the control rod 361.

Briefly, in these various applications, the described arrangement permits the elimination of the transmission of undesirable vibrations by achieving an interruption and a filtering in the region of the homokinetic articulated device and thereby substantially improves the comfort when the arrangement is applied to the automobile.

Having now described my invention what I claim as new and desire to secure by Letters Patent is:

1. A homokinetic transmission device interposed between and combined with a driving member and a driven member comprising two adjacent articulated joints combined with a common intermediate member and together homokinetic, each of which joints comprising an element defining trunnions and rollers which are respectively mounted on the trunnions by means of needle bearings, at least one of the joints being slidable, the two articulated joints being so arranged as to permit a relative radial displacement between the driving member and driven member and, if h and l are the respective distances between centres of the two two adjacent articulated joints and a centre of gravity of the transmission device for interconnecting the driving member and driven members, and $\rho^2$ is equal to Io/m where Io represents the inertia of the intermediate member about an axis perpendicular to the general axis of the intermediate member and to a direction of lateral displacement of said intermediate member and intersecting the centre of gravity G and m represents the mass of the intermediate member, the following condition is at least substantially satisfied:

$$h \times l = \rho^2.$$

2. A device as claimed in claim 1, comprising means for elastically retaining the intermediate member relative to at least one of the driving and driven members.

3. A device as claimed in claim 1 or 2, wherein, in the known manner, the two adjacent joints are joints of the tripod type having rollers mounted on needle bearings.

4. A device as claimed in claim 3, wherein, in the known manner, the intermediate member is a sleeve defining raceways for the rollers of the two tripod joints.

5. A device as claimed in claim 4, comprising an elastically yieldable block between the sleeve and the driven members.

6. A device as claimed in claim 5, wherein the driven member has an extension portion which extends beyond the tripod carried by the driven member and the block is placed between the sleeve and the extension portion.

7. A device as claimed in claim 4, comprising an elastically yieldable block interconnecting the driven member and the driving member inside the sleeve.

8. A device as claimed in claim 3, wherein the intermediate member is a short shaft section having end portions which respectively carry the tripods of the two joints, tulip members which are respectively rigid with the driving and driven members defining raceways for the rollers.

9. A device as claimed in claim 8, comprising a double elastomer gaiter which has a centre portion fixed to the intermediate shaft section and two sleeve portions surrounding the tulip members for retaining the intermediate shaft section.

10. A homokinetic transmission device interposed between and combined with a driving member and a driven member and comprising two adjacent articulated joints combined with a common intermediate member and together homokinetic, each of which joints being of the type comprising a tripod element having rollers mounted on the tripod element by means of needle bearings, the intermediate member being a sleeve defining raceways for the rollers of the two tripod elements, the sleeve carrying an elastically yieldable block having end faces which are in abutment against ends of the driving and driven members, the two articulated joints being so arranged as to permit a relative radial displacement between the driving member and driven member and, if h and l are the respective distances between centres of the two adjacent articulated joints and a centre of gravity of the transmission device for interconnecting the driving member and driven members, and $\rho^2$ is equal to Io/m where Io represents the inertia of the intermediate member about an axis perpendicular to the general axis of the intermediate member and to a direction of lateral displacement of said intermediate member and intersecting the centre of gravity G and m represents the mass of the intermediate member, the following condition is at least substantially satisfied:

$$h \times l = \rho^2.$$

11. A transmission unit, in particular for an automobile vehicle, comprising a driving means and a driven means, one of said means being a transmission shaft which is connected to a first homokinetic articulated joint, means for flexibly and radially guiding the transmission shaft, and a homokinetic transmission device interconnecting the driving means and the driven means and comprising two adjacent second articulated joints combined with a common intermediate member and together homokinetic, each of which joints comprising an element defining trunnions and rollers which are respectively mounted on the trunnions by means of needle bearings, at least one of the second joints being slidable, the two second articulated joints being so arranged as to permit a relative radial displacement between the driving means and driven means and, if h and l are the respective distances between centres of the two adjacent second articulated joints and a centre of gravity of the transmission device for interconnecting the driving means and driven means, and $\rho^2$ is equal to Io/m where Io represents the inertia of the intermediate member about an axis perpendicular to the general axis of the intermediate member and to a direction of lateral displacement of said intermediate member and intersecting the centre of gravity G and m represents the mass of the intermediate member, the following condition is at least substantially satisfied:

$$h \times l = \rho^2.$$

12. A transmission unit as claimed in claim 11, wherein said guiding means comprise an elastically yieldable bearing combined with and carried by a relatively fixed support.

13. A transmission unit as claimed in claim 11, wherein said guiding means comprise an elastically yieldable ball joint combined with and carried by a relatively fixed support.

14. A transmission assembly as claimed in claim 12 or 13, wherein the vehicle has upper and lower suspension arms and the support comprises two branches which are respectively articulated to the upper and lower suspension arms.

15. A transmission unit as claimed in claim 11, wherein said guiding means comprise an elastically yieldable block interposed between the transmission shaft and an element of the homokinetic articulated device.

16. A transmission unit as claimed in claim 11, wherein said guiding means comprise an elastically yieldable block interposed between the transmission shaft and an end of the driving means.

17. A transmission unit as claimed in claim 11, wherein the transmission device is placed between the transmission shaft and the driven means and if:

G is the centre of gravity of a unit formed by the transmission shaft and two tripods respectively carried at ends of the transmission shaft;

H1 is the centre of the first tripod of the transmission device;

H2 is the centre of the second tripod;

J is the centre of gravity of the intermediate member between said two tripods;

K is the centre of a bearing for the transmission shaft;

L is the centre of the first articulated joint;

$I_a$ is the inertia of the shaft provided with its two tripods with respect to an axis intersecting its centre of gravity G and perpendicular to its axis;

$M_a$ is the mass of the transmission shaft provided with its two tripods;

$I_f$ is the inertia of the intermediate member with respect to its axis intersecting its centre of gravity J and perpendicular to its general axis;

$M_f$ is the mass of the intermediate member, the following conditions are satisfied:

$$\overline{GL} \times \overline{GK} = \frac{I_a}{M_a} + \frac{I_f}{M_a} \times \frac{\overline{H_1K} \times \overline{LH_1}}{JH_1 \times H_1H_2} \quad (1)$$

$$JH2 \times JH1 = \frac{I_f}{M_f} \quad (2)$$

18. A transmission unit as claimed in claim 17, wherein the driven means is a vehicle wheel having a pivot axis which intersects the axis of the intermediate member substantially in the middle of the length of the intermediate member.

* * * * *